US012683963B2

(12) United States Patent
Zhong

(10) Patent No.: US 12,683,963 B2
(45) Date of Patent: Jul. 14, 2026

(54) RESOURCE ACCESS CONTROL METHOD, MEDIUM AND ELECTRIC DEVICE BASED ON AN AUTHENTICATION REQUEST

(71) Applicant: Beijing Volcano Engine Technology Co., Ltd., Beijing (CN)

(72) Inventor: Shihang Zhong, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 85 days.

(21) Appl. No.: 18/598,891

(22) Filed: Mar. 7, 2024

(65) Prior Publication Data

US 2024/0305639 A1 Sep. 12, 2024

(30) Foreign Application Priority Data

Mar. 7, 2023 (CN) .......................... 202310238262.0

(51) Int. Cl.
*H04L 9/40* (2022.01)
(52) U.S. Cl.
CPC .............. *H04L 63/10* (2013.01); *H04L 63/08* (2013.01)
(58) Field of Classification Search
CPC ....... H04L 63/10; H04L 63/08; H04L 63/102; H04L 63/1425; G06F 21/31
See application file for complete search history.

(56) References Cited

U.S. PATENT DOCUMENTS

| | | | | |
|---|---|---|---|---|
| 9,356,939 | B1 * | 5/2016 | Gates | ..................... H04L 63/104 |
| 9,712,542 | B1 * | 7/2017 | Brandwine | ............. H04L 67/10 |
| 9,825,911 | B1 * | 11/2017 | Brandwine | ............. H04L 63/20 |
| 9,892,280 | B1 * | 2/2018 | Ullegaddi | ............. H04L 63/102 |
| 9,923,879 | B1 * | 3/2018 | Ziraknejad | ........... H04L 63/107 |
| 9,940,930 | B1 * | 4/2018 | Campbell | ............... G10L 15/22 |
| 10,320,813 | B1 * | 6/2019 | Ahmed | ............... H04L 63/1416 |
| 11,244,336 | B2 * | 2/2022 | Benkreira | .......... G06Q 30/0215 |

(Continued)

FOREIGN PATENT DOCUMENTS

| | | |
|---|---|---|
| CN | 111274595 A | 6/2020 |
| CN | 111382421 A | 7/2020 |

(Continued)

OTHER PUBLICATIONS

International Search Report for PCT/CN2024/080454, mailed May 16, 2024, 8 pages.

(Continued)

*Primary Examiner* — Aravind K Moorthy
(74) *Attorney, Agent, or Firm* — Astute IP Law Group

(57) ABSTRACT

The present disclosure provides a resource access control method, an apparatus, a medium, and an electronic device, the method is to acquire historical resource access information and historical security status information of a target object from a business system according to identity information of the target object, and determine access permission information of the target object for the target resource according to the historical resource access information and the historical security status information, and then send the access permission information to the business system, to enable the business system to determine the operation for the resource access request according to the access permission information.

18 Claims, 7 Drawing Sheets

(56) References Cited

U.S. PATENT DOCUMENTS

| | | | | |
|---|---|---|---|---|
| 11,334,581 | B2* | 5/2022 | Azaria | G06F 16/2465 |
| 11,455,641 | B1* | 9/2022 | Shahidzadeh | H04L 67/306 |
| 11,758,020 | B1* | 9/2023 | Tijerina | G06F 9/485 |
| | | | | 709/238 |
| 11,797,662 | B1* | 10/2023 | Wang | H04W 12/084 |
| 11,836,688 | B1* | 12/2023 | Lawrence | G06F 21/31 |
| 11,909,814 | B1* | 2/2024 | Truelove | H04L 67/1012 |
| 11,960,356 | B1* | 4/2024 | Wang | G06F 11/0712 |
| 11,968,241 | B1* | 4/2024 | Kjelstrup | G06N 20/00 |
| 12,093,916 | B1* | 9/2024 | Terry | G06Q 20/40 |
| 12,400,196 | B1* | 8/2025 | Roth | G06Q 20/0855 |
| 2003/0126439 | A1* | 7/2003 | Wheeler | H04L 63/0861 |
| | | | | 713/168 |
| 2003/0200172 | A1* | 10/2003 | Randle | G06Q 20/12 |
| | | | | 705/39 |
| 2004/0128508 | A1* | 7/2004 | Wheeler | H04L 63/0442 |
| | | | | 713/176 |
| 2006/0173739 | A1* | 8/2006 | Heywood | G06Q 20/04 |
| | | | | 705/14.18 |
| 2008/0226142 | A1* | 9/2008 | Pennella | G06F 21/31 |
| | | | | 382/124 |
| 2009/0199264 | A1* | 8/2009 | Lang | G06F 21/31 |
| | | | | 726/1 |
| 2010/0228624 | A1* | 9/2010 | Morris | G06F 21/34 |
| | | | | 705/14.54 |
| 2011/0196791 | A1* | 8/2011 | Dominguez | G06Q 40/00 |
| | | | | 705/44 |
| 2013/0042298 | A1* | 2/2013 | Plaza Fonseca | H04L 67/02 |
| | | | | 726/1 |
| 2013/0227697 | A1* | 8/2013 | Zandani | G06F 21/57 |
| | | | | 726/25 |
| 2013/0232541 | A1* | 9/2013 | Kapadia | G06F 21/40 |
| | | | | 726/1 |
| 2014/0058912 | A1* | 2/2014 | Bajaj | G06Q 40/00 |
| | | | | 705/35 |
| 2014/0282944 | A1* | 9/2014 | Li | H04L 41/40 |
| | | | | 726/11 |
| 2014/0337243 | A1* | 11/2014 | Dutt | G06Q 20/327 |
| | | | | 705/325 |
| 2015/0215317 | A1* | 7/2015 | Sporel | H04L 47/70 |
| | | | | 726/1 |
| 2016/0180113 | A1* | 6/2016 | Patton | G06F 16/9535 |
| | | | | 726/28 |
| 2016/0212113 | A1 | 7/2016 | Banerjee | |
| 2016/0226914 | A1* | 8/2016 | Doddy | G06F 21/45 |
| 2016/0321108 | A1* | 11/2016 | Xue | G06F 9/5027 |
| 2016/0371471 | A1* | 12/2016 | Patton | G06F 21/554 |
| 2017/0093872 | A1* | 3/2017 | Braksator | H04L 63/102 |
| 2017/0235606 | A1* | 8/2017 | Cherniavsky | G06F 9/5011 |
| | | | | 718/104 |
| 2017/0295183 | A1* | 10/2017 | Movsisyan | H04L 63/105 |
| 2017/0295186 | A1* | 10/2017 | Movsisyan | H04L 63/102 |
| 2017/0300912 | A1* | 10/2017 | Narasimhan | H04L 63/08 |
| 2018/0114212 | A1* | 4/2018 | Beck | G06Q 20/4016 |
| 2018/0115551 | A1* | 4/2018 | Cole | H04L 41/0895 |
| 2018/0260909 | A1* | 9/2018 | Li | G06Q 20/38215 |
| 2019/0058702 | A1* | 2/2019 | Kurian | H04L 63/205 |
| 2019/0124115 | A1* | 4/2019 | Chris | H04L 63/1408 |
| 2019/0188655 | A1* | 6/2019 | Pandit | G06Q 20/223 |
| 2019/0228410 | A1* | 7/2019 | Patel | G06Q 20/3829 |
| 2020/0007510 | A1* | 1/2020 | David | H04L 63/0421 |
| 2020/0076781 | A1* | 3/2020 | Edwards | H04W 12/009 |
| 2020/0204607 | A1* | 6/2020 | Debaes | H04L 65/612 |
| 2020/0280565 | A1* | 9/2020 | Rogynskyy | H04L 67/303 |
| 2020/0285737 | A1* | 9/2020 | Kraus | G06F 21/552 |
| 2020/0302450 | A1* | 9/2020 | Misra | G06Q 30/0185 |
| 2020/0389454 | A1* | 12/2020 | Gulnac | H04L 63/0884 |
| 2020/0404094 | A1* | 12/2020 | Roderick | H04M 3/42221 |
| 2021/0042408 | A1* | 2/2021 | Van Dyke | G06F 21/552 |
| 2021/0044607 | A1* | 2/2021 | Seki | H04L 41/069 |
| 2021/0073838 | A1* | 3/2021 | Verma | G06Q 10/10 |
| 2021/0160276 | A1* | 5/2021 | Broadworth | H04L 65/1046 |
| 2021/0194884 | A1* | 6/2021 | Xie | G06N 20/00 |
| 2021/0216985 | A1* | 7/2021 | Sharma | G06Q 20/145 |
| 2021/0266294 | A1* | 8/2021 | Chechik | H04L 63/105 |
| 2021/0311785 | A1* | 10/2021 | Castinado | G06F 9/5005 |
| 2021/0390165 | A1* | 12/2021 | Zaki | G06F 21/32 |
| 2022/0191235 | A1* | 6/2022 | Ni | G06F 16/245 |
| 2022/0277084 | A1* | 9/2022 | Yang | G06F 21/608 |
| 2022/0292516 | A1* | 9/2022 | Mimassi | G06F 16/285 |
| 2022/0358193 | A1* | 11/2022 | Chaudhary | G06Q 20/4014 |
| 2022/0360608 | A1* | 11/2022 | Raleigh | H04L 47/2408 |
| 2023/0088840 | A1* | 3/2023 | Rudraraju | G06Q 20/4016 |
| | | | | 705/43 |
| 2023/0120032 | A1* | 4/2023 | Sittig | H04M 3/42348 |
| | | | | 340/539.13 |
| 2023/0216887 | A1* | 7/2023 | Strong | H04L 63/20 |
| | | | | 726/4 |
| 2023/0412642 | A1* | 12/2023 | Arora | H04L 63/20 |
| 2023/0419397 | A1* | 12/2023 | Kushner | G06Q 50/186 |
| 2023/0419402 | A1* | 12/2023 | Ghelichi | G06N 5/01 |
| 2024/0020436 | A1* | 1/2024 | Cantrell | G06F 30/20 |
| 2024/0233006 | A1* | 7/2024 | Jayaraman | G06Q 20/227 |
| 2024/0250942 | A1* | 7/2024 | Miel | H04L 63/08 |
| 2024/0403604 | A1* | 12/2024 | Oni | G06N 3/044 |

FOREIGN PATENT DOCUMENTS

| | | |
|---|---|---|
| CN | 112055029 A | 12/2020 |
| CN | 112262384 A | 1/2021 |
| CN | 112653714 A | 4/2021 |
| CN | 115333840 A | 11/2022 |
| CN | 115730324 A | 3/2023 |
| CN | 116821869 A | 9/2023 |
| CN | 116821869 B | 10/2024 |

OTHER PUBLICATIONS

Office Action received for Chinese Patent Application No. 202310238262.0, mailed Mar. 29, 2024, 21 pages.

Notice of Allowance for Chinese Patent Application No. 202310238262. 0, mailed on Aug. 12, 2024, 5 pages.

Extended European Search Report received for European Application No. 24766493.1, mailed on Mar. 18, 2026, 12 pages.

* cited by examiner

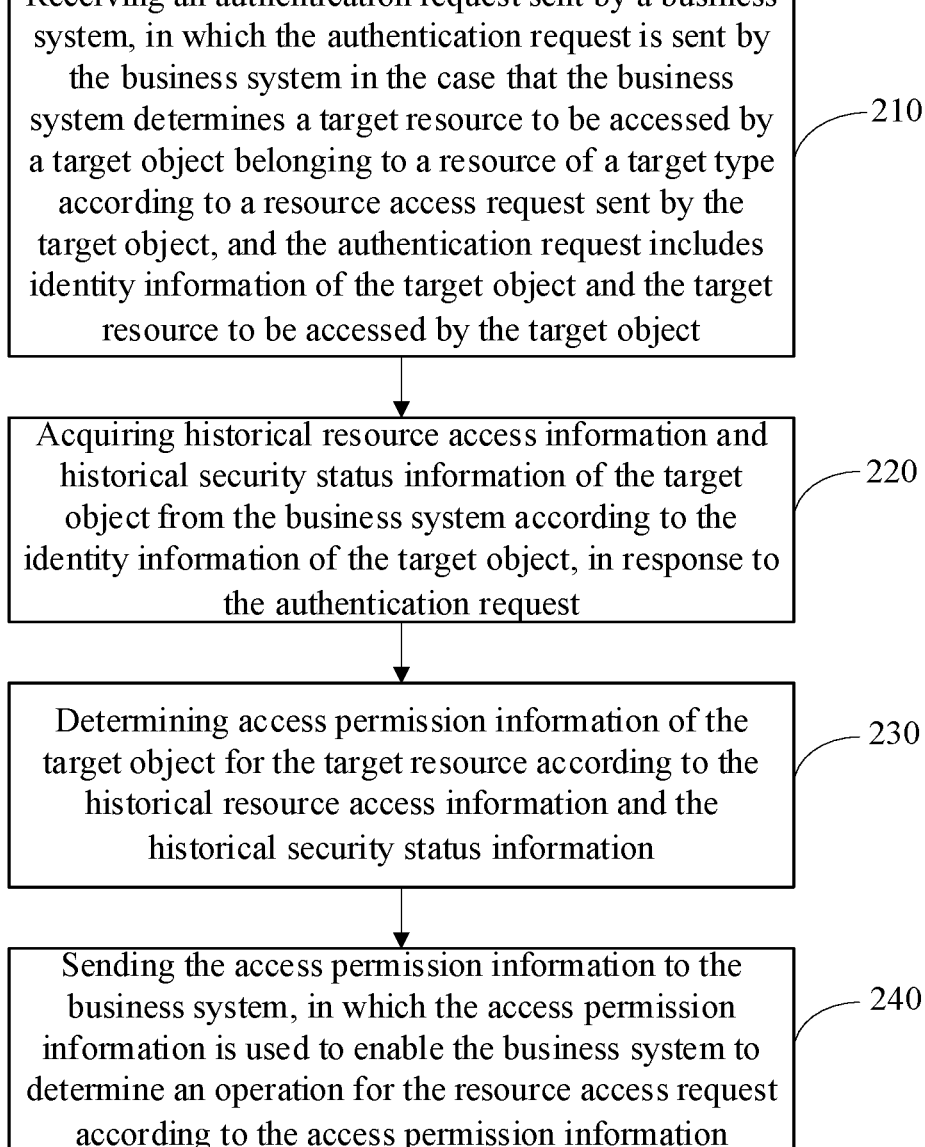

Receiving an authentication request sent by a business system, in which the authentication request is sent by the business system in the case that the business system determines a target resource to be accessed by a target object belonging to a resource of a target type according to a resource access request sent by the target object, and the authentication request includes identity information of the target object and the target resource to be accessed by the target object — 210

Acquiring historical resource access information and historical security status information of the target object from the business system according to the identity information of the target object, in response to the authentication request — 220

Determining access permission information of the target object for the target resource according to the historical resource access information and the historical security status information — 230

Sending the access permission information to the business system, in which the access permission information is used to enable the business system to determine an operation for the resource access request according to the access permission information — 240

FIG. 2

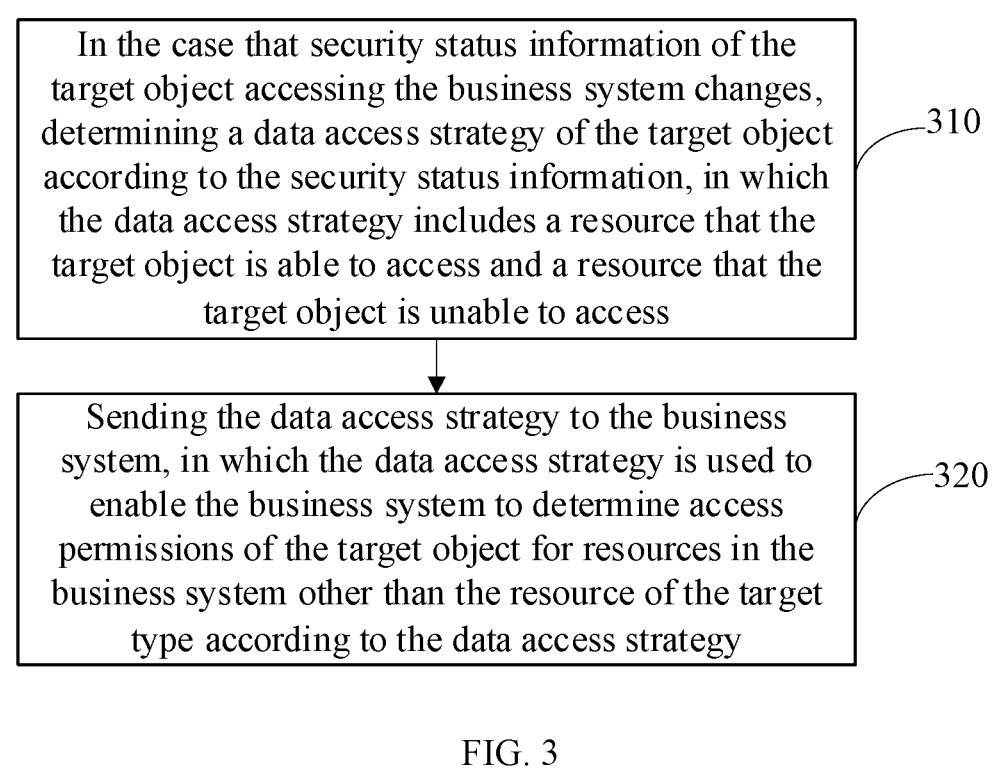

In the case that security status information of the target object accessing the business system changes, determining a data access strategy of the target object according to the security status information, in which the data access strategy includes a resource that the target object is able to access and a resource that the target object is unable to access — 310

Sending the data access strategy to the business system, in which the data access strategy is used to enable the business system to determine access permissions of the target object for resources in the business system other than the resource of the target type according to the data access strategy — 320

FIG. 3

Figure 4:
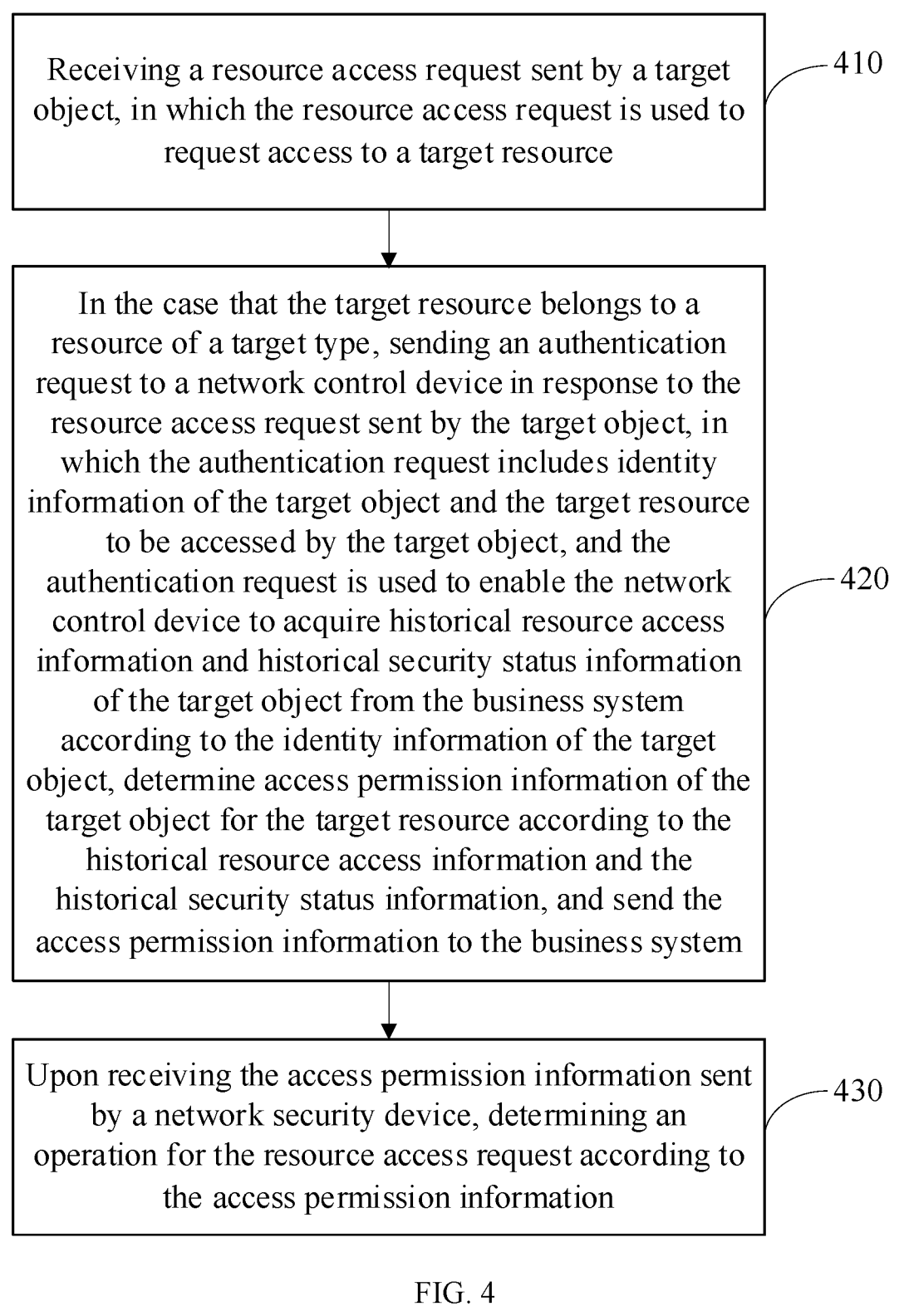

Receiving a resource access request sent by a target object, in which the resource access request is used to request access to a target resource — 410

In the case that the target resource belongs to a resource of a target type, sending an authentication request to a network control device in response to the resource access request sent by the target object, in which the authentication request includes identity information of the target object and the target resource to be accessed by the target object, and the authentication request is used to enable the network control device to acquire historical resource access information and historical security status information of the target object from the business system according to the identity information of the target object, determine access permission information of the target object for the target resource according to the historical resource access information and the historical security status information, and send the access permission information to the business system — 420

Upon receiving the access permission information sent by a network security device, determining an operation for the resource access request according to the access permission information — 430

RESOURCE ACCESS CONTROL METHOD, MEDIUM AND ELECTRIC DEVICE BASED ON AN AUTHENTICATION REQUEST

CROSS-REFERENCE TO RELATED APPLICATION

The present application claims priority of the Chinese Patent Application No. 202310238262.0, filed on Mar. 7, 2023, the disclosure of which is incorporated herein by reference in the present application.

TECHNICAL FIELD

Embodiments of the present disclosure relate to a resource access control method, an apparatus, a medium, and an electronic device.

BACKGROUND

Business systems generally set access permissions of the users to resources of the business systems through usernames and passwords. However, this simple authentication method cannot dynamically adjust the access permissions of the users when the permissions of the users change.

SUMMARY

This summary section is provided to briefly introduce the concepts, which will be described in detail in the detailed description section later. This summary section is not intended to identify key or necessary features of the claimed technical solutions for protection, and not intended to limit the scope of the claimed technical solutions for protection.

In a first aspect, the present disclosure provides a resource access control method, which is applied to a network control device, and the method includes:

receiving an authentication request sent by a business system, wherein the authentication request is sent by the business system in a case that the business system determines a target resource to be accessed by a target object belonging to a resource of a target type according to a resource access request sent by the target object, and the authentication request includes identity information of the target object and the target resource to be accessed by the target object;

acquiring historical resource access information and historical security status information of the target object from the business system according to the identity information of the target object, in response to the authentication request;

determining access permission information of the target object for the target resource according to the historical resource access information and the historical security status information;

and sending the access permission information to the business system, wherein the access permission information is used to enable the business system to determine an operation for the resource access request according to the access permission information.

In a second aspect, the present disclosure provides a resource access control method, which is applied to a business system, and the method includes:

receiving a resource access request sent by a target object, wherein the resource access request is used to request access to a target resource;

in a case that the target resource belongs to a resource of a target type, sending an authentication request to a network control device, wherein the authentication request comprises identity information of the target object and the target resource to be accessed by the target object, and the authentication request is used to enable the network control device to acquire historical resource access information and historical security status information of the target object from the business system according to the identity information of the target object, determine access permission information of the target object for the target resource according to the historical resource access information and the historical security status information, and send the access permission information to the business system;

and upon receiving the access permission information sent by a network security device, determining an operation for the resource access request according to the access permission information.

In a third aspect, the present disclosure provides a resource access control apparatus, which is applied to a network control device, and the apparatus includes:

a first receiving module, configured to receive an authentication request sent by a business system, wherein the authentication request is sent by the business system in a case that the business system determines a target resource to be accessed by a target object belonging to a resource of a target type according to a resource access request sent by the target object, and the authentication request comprises identity information of the target object and the target resource to be accessed by the target object;

an acquisition module, configured to acquire historical resource access information and historical security status information of the target object from the business system according to the identity information of the target object, in response to the authentication request;

a determination module, configured to determine access permission information of the target object for the target resource according to the historical resource access information and the historical security status information;

and a first sending module, configured to send the access permission information to the business system, wherein the access permission information is used to enable the business system to determine an operation for the resource access request according to the access permission information.

In a fourth aspect, the present disclosure provides a resource access control apparatus, which is applied to a business system, and the apparatus includes:

a second receiving module, configured to receive a resource access request sent by a target object, wherein the resource access request is used to request access to a target resource;

a second sending module, configured to send an authentication request to a network control device in a case that the target resource belongs to a resource of a target type, wherein the authentication request comprises identity information of the target object and the target resource to be accessed by the target object, and the authentication request is used to enable the network control device to acquire historical resource access information and historical security status information of the target object from the business system according to the identity information of the target object, determine access permission information of the target object for the target resource according to the historical resource access information and the historical security status information, and send the access permission information to the business system;

and a third receiving module, configured to determine an operation for the resource access request according to the access permission information upon receiving the access permission information sent by a network security device.

In a fifth aspect, the present disclosure provides a computer-readable medium on which a computer program is stored, and in the case that the computer program is executed by a processing apparatus, the steps of the method described in the first aspect or the steps of the method described in the second aspect are implemented.

In a sixth aspect, the present disclosure provides an electronic device, including:

a storage apparatus on which a computer program is stored;

and a processing apparatus for executing the computer program in the storage apparatus to implement the steps of the method described in the first aspect or the steps of the method described in the second aspect.

Based on the above-mentioned technical solutions, by responding to the authentication request sent by the business system, the historical resource access information and the historical security status information of the target object are acquired from the business system according to the identity information of the target object, and the access permission information of the target object for the target resource is determined according to the historical resource access information and the historical security status information, and then the access permission information is sent to the business system, to enable the business system to determine the operation for the resource access request according to the access permission information, so as to dynamically determine the permission of the target object to access the target resource belonging to the target type, and in the case that the security status information of the terminal device does not support the target object to access the target resource, the target object is prohibited to access the target resource to protect the business system from damage. Moreover, through the above-mentioned resource access control method, it is possible to prohibit the target object from accessing the target resource in the case that the security status information of the terminal device does not support the target object to access the target resource, without affecting the working performance of the business system.

The other features and advantages of the present disclosure will be illustrated in detail in the subsequent detailed description section.

BRIEF DESCRIPTION OF DRAWINGS

By combining the drawings and referring to the following specific embodiments, the above-mentioned and other features, advantages, and aspects of respective embodiments of the present disclosure will become more apparent. Throughout the drawings, the same or similar reference numerals indicate the same or similar elements. It should be understood that the drawings are illustrative, and the components and elements may not necessarily be drawn to scale. In the drawings:

FIG. 2 is a flowchart of a resource access control method provided by an exemplary embodiment;

FIG. 3 is a flowchart of a resource access control method provided by another exemplary embodiment;

FIG. 4 is a flowchart of a resource access control method provided by another exemplary embodiment;

DETAILED DESCRIPTION

Figure 1:
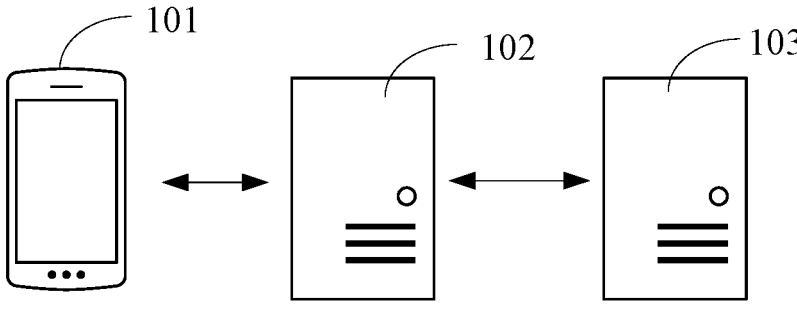
FIG. 1 is a schematic diagram of an application scenario of a resource access control method provided by an exemplary embodiment.

Embodiments of the present disclosure are described in detail below with reference to the drawings. Although certain embodiments of the present disclosure are shown in the drawings, it should be understood that the present disclosure may be implemented in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the protection scope of the present disclosure.

It should be understood that various steps recorded in the implementations of the methods of the present disclosure may be performed according to different orders and/or performed in parallel. In addition, the implementations of the methods may include additional steps and/or steps omitted or unshown. The scope of the present disclosure is not limited in this aspect.

As used herein, the term "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different apparatuses, modules or units, and are not used to limit the interdependence relationship or the order of functions performed by these apparatuses, modules or units.

It should be noted that the modifications of "a," "an," "a plurality of," or the like mentioned in the present disclosure are illustrative rather than restrictive, and those skilled in the art should understand that unless the context clearly indicates otherwise, these modifications should be understood as "one or more."

The names of the messages or information exchanged between a plurality of apparatuses in the embodiments of the present disclosure are for illustrative purposes only and are not intended to limit the scope of these messages or information.

It may be understood that before using the technical solutions disclosed in the embodiments of the present disclosure, it is necessary to inform user(s) the types, using scope, and using scenarios of personal information involved in the present disclosure according to relevant laws and regulations in an appropriate manner and obtain the authorization of the user(s).

For example, in response to receiving a user's active request, a prompt message is sent to the user to clearly remind the user that the requested operation will require acquiring and using the user's personal information. Thus, users can selectively choose whether to provide personal information to the software or hardware such as an electronic device, an application, a server, or a storage medium that perform the operations of the technical solutions of the present disclosure according to the prompt message.

As an optional but non-restrictive implementation, in response to receiving the user's active request, sending the prompt message to the user may be done in the form of a pop-up window, where the prompt message may be presented in text. In addition, the pop-up window may further carry a selection control for users to choose between "agree" or "disagree" to provide the personal information to an electronic device.

It may be understood that the above-mentioned processes of informing and acquiring user authorization are only illustrative and do not limit the embodiments of the present disclosure. Other methods that comply with relevant laws and regulations may also be applied to the embodiments of the present disclosure.

Meanwhile, it may be understood that the data involved in the technical solutions (including but not limited to the data itself, data acquisition or use) should comply with the requirements of corresponding laws, regulations and relevant provisions.

FIG. 1 is a schematic diagram of an application scenario of a resource access control method provided by an exemplary embodiment. As shown in FIG. 1, the resource access control method provided by the embodiments of the present disclosure is applicable to the application scenario shown in FIG. 1. In this application scenario, a terminal device 101, a business system 102, and a network control device 103 are included. Among them, the terminal device 101 is communicatively connected to the business system 102, and the business system 102 is communicatively connected to the network control device 103. It should be understood that the communication connection may refer to the case that data exchange is performed through wired or wireless connection.

The terminal device 101 sends a resource access request of a target object to the business system 102, and the resource access request may include the security status information of the target object and a target resource to be accessed by the target object. The security status information includes the identity information of the target object. The business system 102 sends an authentication request to the network control device 103 in response to the resource access request in the case that the target resource belongs to the resource of a target type. The authentication request includes the identity information of the target object and the target resource to be accessed. The network control device 103 acquires historical resource access information and historical security status information of the target object from the business system 102 according to the identity information of the target object in response to the authentication request, and determines access permission information of the target object for the target resource according to the historical resource access information and the historical security status information. The historical resource access information refers to the resources accessed by the target object and recorded by the business system 102 when the target object visits the business system 102 every time, and the historical security status information refers to the security status information recorded by the business system 102 when the target object visits the business system 102 every time. After obtaining the access permission information, the network control device 103 sends the access permission information to the business system 102. The business system 102 receives the access permission information from the network control device 103 and determines the operation for the resource access request according to the access permission information. For example, in the case that the access permission information represents allowing the target object to access the target resource, the business system 102 can forward the resource access request of the target object to a target business, so that the target object can access the target resource of the target business.

It is worth noting that the terminal device 101 may be a mobile terminal such as a mobile phone, a notebook computer, a digital broadcasting receiver, a personal digital assistant (PDA), a tablet computer (PAD), a portable multimedia player (PMP), a vehicle terminal (such as a vehicle navigation terminal), or a fixed terminal such as a digital television (TV), a desktop computer, and the like. The target object may send the resource access request to the business system 102 through a client installed in the terminal device 101, and the client may be a web client or an application. The business system 102 may include an authentication service and a backend server deploying an application system, and the authentication service is used to verify the access permission of the target object and forward the resource access request to the application system to enable the target object to access the resource in the application system. For example, in a Virtual Private Network (VPN) single sign on scenario, the terminal device 101 logs in to the authentication service by entering the target object's account and password. After the authentication service is certificated successfully, a session is created. The target object initiates the resource access request to the application system of the backend server through an authentication server to access the resource in the application system. The network control device 103 is served as a server for verifying the access permission information of the target object for the target resource, and in this network control device 103, the resource access control method provided by the embodiments of the present disclosure, which is executed by the network control device 103, may be implemented by deploying a dynamic control engine. It should be understood that due to the large number of business systems 102 used by the enterprise, there may be a plurality of business systems 102 connected to the network control device 103.

In the following, a detailed illustration of the resource access control method provided by the embodiments of the present disclosure will be provided in conjunction with the drawings.

FIG. 2 is a flowchart of a resource access control method provided by an exemplary embodiment. As shown in FIG. 2, the resource access control method provided by the embodiments of the present disclosure can be applied to the network control device 103 shown in FIG. 1. As shown in FIG. 2, the resource access control method may include the following steps.

In the step 210, receiving an authentication request sent by a business system, in which the authentication request is sent by the business system in the case that the business system determines a target resource to be accessed by a target object belonging to a resource of a target type according to a resource access request sent by the target object, and the authentication request includes identity information of the target object and the target resource to be accessed by the target object.

Here, the network control device receives the authentication request sent by the business system through the communication connection with the business system. The authentication request may include the identity information of the target object and the target resource to be accessed by the target object. The target object refers to the account logged in to the terminal device, and the identity information of the target object may refer to the target object's account, password, verification code, or other information used for identity verification. Of course, the identity information may also refer to facial information, fingerprint information, or other biometric features used for identity verification. The target resource to be accessed by the target object refers to a specific resource in the business system that the target object needs to access for the resource access request sent this time. For example, the target resource may refer to a certain resource in the application system, or may refer to a network resource such as VPN, Wi-Fi (Wireless Fidelity), and so on.

It should be understood that authentication request is a request sent to the network control device in the case that the business system receives the resource access request sent by the target object through the terminal device, and it is determined that the target resource to be accessed by the target object belongs to the resource of the target type according to the resource access request. This authentication request is used to request the network control device to determine whether the target object is allowed to access the target resource.

The resource belonging to the target type represents that the resource belongs to sensitive resources in the business system, and the target object requires a higher level of security when accessing the resource. Therefore, in the case that the target resource to be accessed by the target object belongs to the resource of the target type, the network control device needs to evaluate whether there is a risk for the target object to access the target resource in the current security status. For other resources in the business system that do not belong to the target type, the business system can control access to the target object through a data access strategy. For example, the data access strategy includes a resource that the target object is able to access and a resource that the target object is unable to access.

It is worth noting that the relevant meanings of the security status information will be illustrated in detail in subsequent embodiments.

In the step 220, acquiring historical resource access information and historical security status information of the target object from the business system according to the identity information of the target object, in response to the authentication request.

Here, the network control device accesses the business system in respond to the authentication request sent by the business system, and acquires the historical resource access information and the historical security status information that match the identity information of the target object from the business system.

The historical resource access information refers to the information of the resource that the target object has accessed during historical time, such as the information of the resource of the business system that the target object has recently accessed. For example, every time the target object accesses a resource in the business system, the business system may record the target object's access time, geographical location, name information of the accessed resource, and operation behavior for the resource, and form the historical resource access information. It should be understood that the operation behavior for the resource may include viewing, modifying, sending to the outside network, and other behavior.

The historical security status information refers to the security status information of the target object when accessing the business system during historical time. For example, every time the target object accesses a resource in the business system, the resource access request sent by the target object may carry the security status information of the target object. When the business system receives the resource access request, the business system records the security status information carried by the resource access request, and forms the historical security status information. The security status information may include the identity information of the target object and network security information used to represent the security status of the network environment where the target object is located. The network security information may include at least one of the device information of the terminal device corresponding to the target object, software environment information, and geographic location information. The device information may refer to the IP (Internet Protocol) address, MAC (Media Access Control) address and other information of the terminal device. The software environment information may refer to the information used to represent the security status of the network environment when the terminal device accesses the business system. For example, the software environment information may include applications installed on the terminal device, the port opened by the terminal device, the used network type, and so on. The software environment information can be used to determine whether the terminal device is in a secure status when accessing the business system. For example, in the case that the applications installed on the terminal device include a risky application, it indicates that the terminal device is in an unsafe state. In the case that the applications installed on the terminal device does not include an antivirus application, it indicates that the terminal device is in an unsafe state. For example, in the case that a risky port is opened on the terminal device, it indicates that the terminal device is in an unsafe state. For example, in the case that the network type used by the terminal device is a public network, it indicates that the terminal device is in an unsafe state.

In some embodiments, the network control device may read the historical resource access information and the historical security status information of the target object from a log database of the business system. The business system may store the resource access information and the security status information of the target object every time when the target object accesses the business system in a log database in the form of logs, and form the historical resource access information and the historical security status information. When the network control device receives the authentication request, the network control device responds to the authentication request and reads log data that matches the identity information of the target object from the business system's log database, and obtains the historical resource access information and the historical security status information of the target object.

In the step 230, determining access permission information of the target object for the target resource according to the historical resource access information and the historical security status information.

Here, after acquiring the historical resource access information and the historical security status information of the target object from the business system, the network control device determines whether the target object is able to access the target resource and obtains the access permission information, according to the historical resource access information and the historical security status information.

In some embodiments, it is possible to determine that the target object is able to access the target resource in the case that the historical resource access information and the historical security status information respectively match the resource access information and security status information required to access the target resource.

For example, in the case that the historical resource access information of the target object indicates that the target object has visited a risky website in the past, the target object cannot access the target resource. For another example, in the case that the historical security status information of the target object indicates that the terminal device of the target object has installed a risky application, the target object cannot access the target resource.

In other embodiments, the historical resource access information and the historical security status information may be input into an access strategy model to obtain the access permission information output by the access strategy model.

The access strategy model may be obtained by training a neural network model using sample resource access information marked with access permission information and sample security status information.

It is worth noting that for different resources belonging to the target type in the business system, the historical resource access information and the historical security status information required to access the resources may be different. For example, for the most sensitive resources or resources that can only be accessed with the highest permission in the business system, it is necessary to ensure that the target object is at the highest security level to access the resource, in this case, the historical resource access information and the historical security status information of the target object need to meet higher requirements.

In the step 240, sending the access permission information to the business system, in which the access permission information is used to enable the business system to determine an operation for the resource access request according to the access permission information.

Here, after obtaining the access permission information, the network control device can send the access permission information to the business system through the communication connection with the business system, so that the business system can determine the operation for the resource access request according to the access permission information. The operation for the resource access request may be to determine whether the target object is allowed to access the target resource and/or whether higher-level authentication is required for the target object.

For example, in the case that the access permission information represents that the target object is not allowed to access the target resource, the business system blocks the resource access request of the target object to the target resource. In the case that the access permission information represents that the target object is allowed to access the target resource, the business system releases the resource access request of the target object to enable the target object to access the target resource. In the case that the access permission information represents that it requires higher-level authentication for the target object, the business system sends an identity authentication request to the terminal device of the target object to enable the target object to perform the higher-level identity authentication.

Taking the VPN single sign on scenario as an example, after receiving a resource access request from the target object, the VPN business system sends an authentication request to the network control device in the case that the business system determines that the target resource to be accessed by the resource access request belongs to the resource of the target type, to obtain the access permission information sent by the network control device in response to the authentication request. In the case that the access permission information represents that the target object is not allowed to access the target resource, the VPN business system blocks the forwarding of the target resource to prevent the target object from accessing the target resource. In the case that the access permission information represents that the target object is allowed to access the target resource, the VPN business system forwards the target resource to the terminal device of the target object, so that the target object can access the target resource.

Therefore, by responding to the authentication request sent by the business system, the historical resource access information and the historical security status information of the target object are acquired from the business system according to the identity information of the target object, and the access permission information of the target object for the target resource is determined according to the historical resource access information and the historical security status information, and then the access permission information is sent to the business system, to enable the business system to determine the operation for the resource access request according to the access permission information, so as to dynamically determine the permission of the target object to access the target resource belonging to the target type, and in the case that the real-time security status of the terminal device does not support the target object to access the target resource, the target object is prohibited to access the target resource to protect the business system from damage. Moreover, through the above-mentioned resource access control method, it is possible to prohibit the target object from accessing the target resource in the case that the security status information of the terminal device does not support the target object to access the target resource, without affecting the working performance of the business system.

In some embodiments, the network control device may store the access permission information in a disposal log database to enable traceability according to the data in the disposal log database during a subsequent traceability audit process.

In some embodiments, determining a target risk item triggered by the target object, according to the historical resource access information and the historical security status information and in conjunction with a preset mapping relationship, in which the mapping relationship includes a corresponding relationship between different combinations of the historical resource access information and the historical security status information, and different risk items; and determining the access permission information of the target object for the target resource according to the target risk item.

Here, the mapping relationship refers to the corresponding relationship between different risk items and different combinations of the historical resource access information and the historical security status information. A plurality of corresponding relationships may be stored in advance in the network control device to determine whether there is a risk when the target object accesses the business system.

For example, the historical resource access information includes access time of the resource, geographic location, name information of the accessed resource, and operation behavior for the resource. The security status information may include the identity information of the target object and the network security information used to represent the security status of the network environment where the target object is located. In the case that the geographic location information in the historical resource access information represents that the geographic location of the target object when requesting access to the target resource is not a commonly used location for the target object to access the business system, a geographic location change risk item is triggered. Correspondingly, the access permission information corresponding to the geographic location change risk item may be multi-authentication of the target object, and after the multi-authentication is passed, access to the target resource is allowed.

For another example, in the case that the historical security status information of the target object represents that the target object is about to resign, and the historical resource access information of the target object represents that the target object has more than a preset number of data sending out events, a data sending out risk item is triggered. Correspondingly, the access permission information corresponding to the data sending out risk item may be to prohibit the target object from accessing the target resource.

For another example, in the case that the historical security status information of the target object represents that the terminal device requesting access to the target resource changes compared to the terminal device previously accessing the business system, and the historical security status information represents that the target object has opened a risky port that has remote login permission, weak code, and the like, a device security risk item is triggered. Correspondingly, the access permission information corresponding to the device security risk item may be to prohibit the target object from accessing the target resource and/or to prohibit the target object from accessing the business system.

It is worth noting that the mapping relationship is a calculation rule used to determine whether there is a risk item in the historical resource access information and the historical security status information. If it is determined that the target object has not triggered any risk items according to all mapping relationships, the target object can be allowed to access the target resource.

It should be understood that the historical security status information may reflect the changes in security status information of the terminal device during a historical period. For example, the historical security status information may be used to determine whether the terminal device used by the target object to access the business system has changed, whether the network environment has changed, and so on. The historical resource access information may reflect the changes in the behavior habits of the target object accessing the resource in the business system during a historical period. For example, through the historical resource access information, it is possible to determine whether the type of the resource accessed by the target object has changed, and whether the operation behavior for the resource has changed. By combining the historical resource access information and the historical security status information with the mapping relationship, the behavior of the target object's historical access to the business system can be analyzed to dynamically adjust the access permission of the target object to sensitive resources in the business system according to the changes in behavior, thereby protecting sensitive resources in the business system from damage.

FIG. 3 is a flowchart of a resource access control method provided by another exemplary embodiment. As shown in FIG. 3, in some embodiments, the resource access control method may include the following steps.

In the step 310, in the case that security status information of the target object accessing the business system changes, determining a data access strategy of the target object according to the security status information, in which the data access strategy includes a resource that the target object is able to access and a resource that the target object is unable to access.

Here, in the case that the security status information of the target object accessing the business system changes, the network control device re-determines the data access strategy of the target object according to the latest security status information of the target object, and the data access strategy includes the resource that the target object is able to access and the resource that the target object is unable to access.

It should be understood that the data access strategy refers to the access permissions for resources in the business system that do not belong to the target type when the target object accesses the business system. For example, the data access strategy may include a first resource set that the target object is unable to access and a second resource set that the target object is able to access. The resources included in the first resource set and the second resource set may be all other resources that the business system can provide that do not belong to the target type.

Each target object has a default data access strategy, which may be an initial data access strategy configured for the target object according to the own permission level of the target object. In the case that the target object first accesses the business system, the business system provides resources that the target object can access to the target object according to the default data access strategy. In the case that the security status information of the target object changes, the network control device recalculates the data access strategy of the target object according to the security status information of the target object, and allows the business system to adjust the access permission of the target system to resources in the business system according to the recalculated data access strategy.

It is worth noting that determining the data access strategy of the target object according to the security status information may be calculating the security level of the terminal device according to the security status information, and determining the data access strategy according to the security level. For example, under the first security status information, the first security status information corresponds to the first security level, and under the identity level of the target object and the first security level, the target object can access a resource A, a resource B, a resource C, a resource D, and a resource E. In the case that the security level of the target object is changed to the second security level, as the second security level is lower than the first security level and the second security level cannot reach the minimum security level required to access the resource D and the resource E, the target object can access the resource A, the resource B, and the resource C under the identity level of the target object and the second security level.

In some embodiments, the network control device may receive an information change event sent by a security information data source, in which the information change event is sent by the security information data source to the network control device when the security information data source detects a change in the security status information of the target object.

The information change event is used to notify the network control device that the security status information of the target object accessing the business system has changed. For example, every time the target object accesses the business system, the security information data source records the latest security status information of the target object, and generates an information change event when the latest security status information changes from the last recorded security status information. The network control device subscribes to the information change event, and in the case that the information change event is detected, the network control device determines that the security status information of the target object accessing the business system has changed, and begins to recalculate the data access strategy of the target object for the business system according to the latest security status information of the target object.

It is worth noting that the security information data source may be set in the business system. For example, every time the business system receives a resource access request from the terminal device, the business system records the security status information carried in the resource access request through the security information data source. Of course, the security information data sources may also be set in the network control device. For example, the network control device may store the security status information of the target object, and a manager or the terminal device can update the security status information of the target object stored in the network control device.

In the step 320, sending the data access strategy to the business system, in which the data access strategy is used to enable the business system to determine access permissions of the target object for resources in the business system other than the resource of the target type according to the data access strategy.

Here, after obtaining the data access strategy, the network control device sends the data access strategy to the business system, so that the business system can adjust the access permissions of the target object for the business system according to the data access strategy. For example, for resources that the target object can access, the business system allows the target object to access, and for resources that the target object cannot access, the business system refuses the target object to access.

It is worth noting that the data access strategy is aimed at access permissions of the resources in the business system other than the resource of the target type. In the case that the target object needs to access the resource belonging to the target type in the business system, the access permission of the target object for the resource belonging to the target type may be determined according to the above-mentioned steps 210 to 240.

In some embodiments, the network control device may create a permission change task and save the permission change task in a task queue, execute the permission change task in the task queue, and store the data access strategy in a data access table, in which the data access table is used for the business system to obtain the data access strategy from the data access table.

The network control device responds to the information change event, determines the data access strategy according to the security status information, creates the permission change task, and submits the permission change task to the task queue. Then, the network control device executes the permission change task in the task queue and stores the corresponding data access strategy in the data access table. The data access table is used for the business system to obtain the data access strategy from the data access table. For example, the business system may periodically obtain the data access strategy from the data access table and update the data access strategy in the business system.

It is worth noting that the permission change task in the task queue will only be completed after the corresponding data access strategy is successfully obtained by the business system. If the data access strategy has not been successfully obtained by the business system, the permission change task in the task queue will not be completed, and the permission change task may be executed multiple times to ensure that the data access strategy can be successfully obtained by the business system.

It should be understood that the above-mentioned data access strategy may be used to control the access permissions of the target object for the resources in the business system other than the target resource, and may also be used to control the access permission of the target resource, which may be set as needed in practical applications.

Therefore, in the case that the security status information of the target object changes, the data access strategy of the target object is determined according to the security status information of the target object, and the data access strategy is sent to the business system, which allows the business system to adjust the access permission of the target object for the business system according to the data access strategy, so that the business system does not need to evaluate every access of the target object, instead, the business system directly determines the resource access permission of the target object according to the data access strategy, without affecting the working performance of the business system; especially for a high traffic business system, if every access of the target object is evaluated, it will reduce the working performance of the business system. Moreover, the process of determining the data access strategy is placed in the network control device, so that the permission change behavior of the target object will not invade the functions of the business system, thereby ensuring the normal operation of the business system.

In some embodiments, the network control device may obtain permission change information according to the data access strategy, and send the permission change information to the business system. The permission change information is used to enable the business system to send the permission change information to the terminal device of the target object through a long connection channel between the business system and the terminal device, to display the permission change information on the terminal device.

Here, the network control device may generate the permission change information according to the data access strategy after obtaining the data access strategy. The permission change information is used to represent that the resource access permission of the target object for the business system has changed. For example, in the case that the data access strategy represents that the access permission of the target object for the business system is downgraded, the permission change information indicating that the access permission of the target object for the business system has been downgraded may be generated.

After generating the permission change information, the network control device sends the permission change information to the business system. The business system receives the permission change information and sends the permission change information to the terminal device through a long connection channel with the terminal device of the target object, to display the permission change information on the terminal device and enable the target object to eliminate the risk information according to the permission change information.

The long connection channel may refer to the long connection between the terminal device and the business system through WebSocket (a protocol for full duplex communication over a single TCP (Transmission Control Protocol) connection).

For example, the network control device may save the permission change information in the message queue, and the message queue is used for the business system to obtain the permission change information from the message queue.

It is worth noting that after obtaining the permission change information from the message queue, the business system sends the permission change information to the terminal device through WebSocket. The terminal device then displays the received WebSocket message on the client as a reminder or a notification to remind the target object to repair the existing risks.

It should be understood that in the case that the target object has repaired the existing risks, the security status information of the target object will change. Correspondingly, the network control device will update the data access strategy of the target object in the business system, so that the target object can restore access to the business system.

Therefore, by sending the permission change information to the business system, the target object can perceive the access permission change according to the permission change information and guide the target object to repair the existing risk items.

FIG. 4 is a flowchart of a resource access control method provided by another exemplary embodiment. As shown in FIG. 4, the resource access control method provided by the embodiments of the present disclosure may be applied to the business system 102 shown in FIG. 1. As shown in FIG. 4, the resource access control method may include the following steps.

In the step 410, receiving a resource access request sent by a target object, in which the resource access request is used to request access to a target resource;

Here, the business system receives the resource access request sent by the target object to the business system through the communication connection with the terminal device. This resource access request is used to request access to the target resource in the business system.

It is worth noting that a detailed illustration of the resource access request may refer to the above-mentioned embodiments, which will not be repeated here.

In the step 420, in the case that the target resource belongs to a resource of a target type, sending an authentication request to a network control device in response to the resource access request sent by the target object, in which the authentication request includes identity information of the target object and the target resource to be accessed by the target object, and the authentication request is used to enable the network control device to acquire historical resource access information and historical security status information of the target object from the business system according to the identity information of the target object, determine access permission information of the target object for the target resource according to the historical resource access information and the historical security status information, and send the access permission information to the business system.

Here, the business system receives the resource access request sent by the target object, and sends the authentication request to the network control device through the communication connection with the network control device in response to the resource access request, in the case that it is determined that the target resource to be accessed by the target object belongs to the resources of the target type. The authentication request may include the identity information of the target object and the target resource to be accessed by the target object. The target object refers to the account logged in to the terminal device, and the identity information of the target object may refer to the target object's account, password, verification code, or other information used for identity verification. Of course, the identity information may also refer to facial information, fingerprint information, or other biometric features used for identity verification. The target resource to be accessed by the target object refers to a specific resource in the business system that the target object needs to access for the resource access request sent this time. For example, the target resource may refer to a certain resource in the application system, or may refer to a network resource such as VPN, Wi-Fi, and so on.

It should be understood that authentication request is a request sent to the network control device in the case that the business system receives the resource access request sent by the target object through the terminal device, and it is determined that the target resource to be accessed by the target object belongs to the resource of the target type according to the resource access request. This authentication request is used to request the network control device to determine whether the target object is allowed to access the target resource.

The resource belonging to the target type represents that the resource belongs to sensitive resources in the business system, and the target object requires a higher level of security when accessing the resource. Therefore, in the case that the target resource to be accessed by the target object belongs to the resource of the target type, the network control device needs to evaluate whether there is a risk for the target object to access the target resource in the current security status. For other resources in the business system that do not belong to the target type, the business system can control access to the target object through a data access strategy. For example, the data access strategy includes a resource that the target object is able to access and a resource that the target object is unable to access.

It is worth noting that details on how the network control device obtains the access permission information in response to the authentication request may be referred to the related descriptions of the above-mentioned embodiments, which will not be repeated here.

In the step 430, upon receiving the access permission information sent by a network security device, determining an operation for the resource access request according to the access permission information.

Here, the business system receives the access permission information sent by the network control device, and upon receiving the access permission information sent by the network security device, determines the operation for the resource access request according to the access permission information.

For example, in the case that the access permission information represents that the target object is not allowed to access the target resource, the business system blocks the resource access request of the target object to the target resource. In the case that the access permission information represents that the target object is allowed to access the target resource, the business system releases the resource access request of the target object to enable the target object to access the target resource. In the case that the access permission information represents that it requires higher-level authentication for the target object, the business system sends an identity authentication request to the terminal device of the target object to enable the target object to perform the higher-level identity authentication.

Therefore, by sending the authentication request to the network control device and receiving the access permission information sent by the network control device in response to the authentication request, and determining the operation for the resource access request according to the access permission information, it is possible to dynamically determine the access permission of the target object to the target resource when the security status of the terminal device changes, so that in the case that the real-time security status of the terminal device does not support the target object to access the target resource, the target object is prohibited to access the target resource, to protect the business system from damage. Moreover, through the above-mentioned resource access control method, it is possible to prohibit the target object from accessing the target resource in the case that the real-time security status of the terminal device does not support the target object to access the target resource, without affecting the working performance of the business system.

In some embodiments, the business system may also determine the access permissions of the target object for resources in the business system other than the resource of the target type according to the data access strategy, in the case that the business system receives the data access strategy from the network control device.

Here, the data access strategy refers to the access permissions for resources in the business system that do not belong to the target type when the target object accesses the business system. For example, the data access strategy may include a first resource set that the target object is unable to access and a second resource set that the target object is able to access. The resources included in the first resource set and the second resource set may be all other resources that the business system can provide that do not belong to the target type.

The data access strategy is aimed at access permissions of other resources in the business system except for the resource of the target type. In the case that the target object needs to access the resource belonging to the target type in the business system, the business system can determine the access permission of the target object for the resource belonging to the target type according to the above-mentioned steps 410 to 430.

The data access strategy is determined by the network control device according to the security status information of the target object accessing the business system in the case that the security status information of the target object changes, and the data access strategy includes a resource that the target object is able to access and a resource that the target object is unable to access.

It is worth noting that regarding how to determine the data access strategy and how to receive the data access strategy, the above embodiments may be referred to, which will not be repeated here.

Therefore, through the data access strategy, the business system does not need to evaluate every access of the target object, instead, the business system directly determines the resource access permission of the target object according to the data access strategy, without affecting the working performance of the business system; especially for a high traffic business system, if every access of the target object is evaluated, it will reduce the working performance of the business system. Moreover, the process of determining the data access strategy is placed in the network control device, so that the permission change behavior of the target object will not invade the functions of the business system, thereby ensuring the normal operation of the business system.

In some embodiments, in the case that the business system receives the permission change information sent by the network control device, the business system can send the permission change information to the terminal device through a long connection channel with the terminal device of the target object to display the permission change information on the terminal device. The permission change information is generated by the network control device according to the data access strategy, and the permission change information is used to represent that the resource access permission of the target object for the business system has changed.

Here, the relevant descriptions of the generation process of the permission change information, how the business system obtains the permission change information, and how the business system sends the permission change information to the terminal device may be referred to the above-mentioned embodiments, which will not be repeated here.

Therefore, through the permission change information, the target object can perceive the access permission change according to the permission change information, and guide the target object to repair existing risk items.

Figure 5:
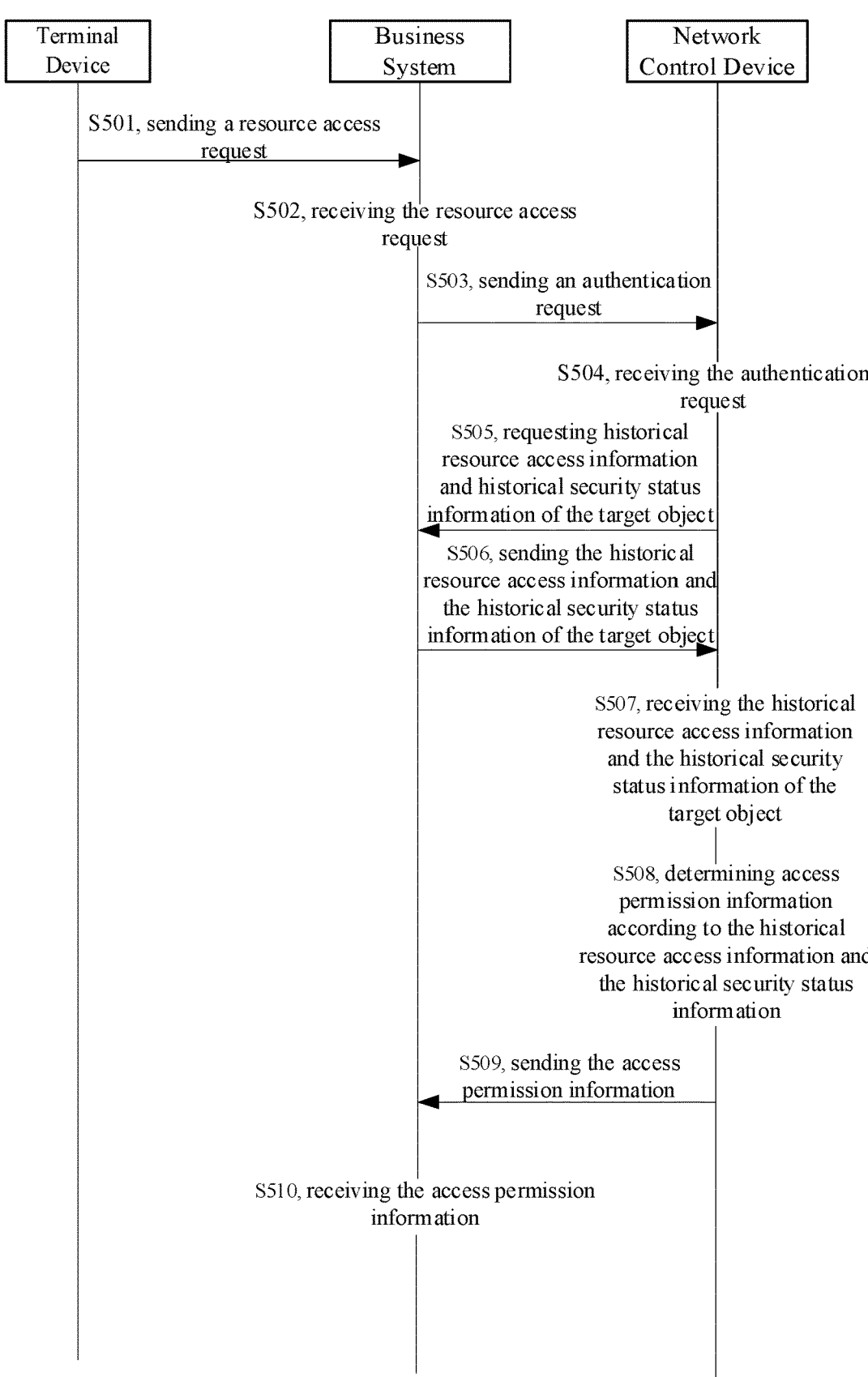
FIG. 5 is a flowchart of a resource access control method provided by yet another exemplary embodiment.

FIG. 5 is a flowchart of a resource access control method provided by another exemplary embodiment. As shown in FIG. 5, the resource control method may include the following steps.

S501, a terminal device sends a resource access request to a business system;

S502, the business system receives the resource access request;

S503, the business system sends an authentication request to a network control device;

S504, the network control device receives the authentication request;

S505, the network control device requests historical resource access information and historical security status information of the target object from the business system;

S506, the business system sends the historical resource access information and the historical security status information of the target object to the network control device;

S507, the network control device receives the historical resource access information and the historical security status information of the target object;

S508, the network control device determines access permission information according to the historical resource access information and the historical security status information;

S509, the network control device sends the access permission information to the business system;

and S510, the business system receives the access permission information.

It is worth noting that the specific implementation processes of S501 to S510 may refer to the relevant descriptions of the above-mentioned embodiments, which will not be illustrated in detail here.

Figure 6:
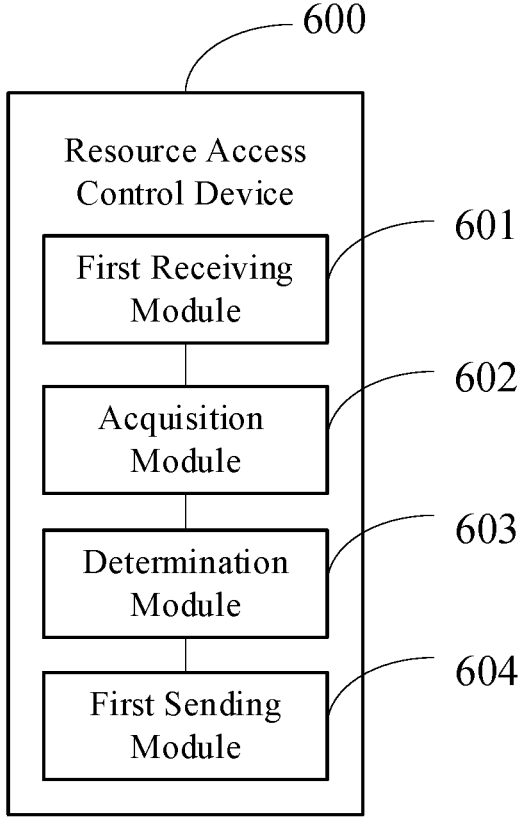
FIG. 6 is a schematic structural diagram of a resource access control apparatus provided by an exemplary embodiment.

FIG. 6 is a schematic structural diagram of a resource access control apparatus provided by an exemplary embodiment. As shown in FIG. 6, the embodiments of the present disclosure provide a resource access control apparatus, which is applied to a network control device, and the resource access control apparatus 600 includes:

a first receiving module 601, configured to receive an authentication request sent by a business system, in which the authentication request is sent by the business system in the case that the business system determines a target resource to be accessed by a target object belonging to a resource of a target type according to a resource access request sent by the target object, and the authentication request includes identity information of the target object and the target resource to be accessed by the target object;

an acquisition module 602, configured to acquire historical resource access information and historical security status information of the target object from the business system according to the identity information of the target object, in response to the authentication request;

a determination module 603, configured to determine access permission information of the target object for the target resource according to the historical resource access information and the historical security status information;

and a first sending module 604, configured to send the access permission information to the business system, in which the access permission information is used to enable the business system to determine an operation for the resource access request according to the access permission information.

Optionally, the determination module 603 is specifically configured to:

determine a target risk item triggered by the target object, according to the historical resource access information and the historical security status information and in conjunction with a preset mapping relationship, in which the mapping relationship includes a corresponding relationship between different combinations of the historical resource access information and the historical security status information, and different risk items;

and determine the access permission information of the target object for the target resource according to the target risk item.

Optionally, the apparatus 600 further includes:

a strategy adjusting module, configured to, in the case that the security status information of the target object accessing the business system changes, determine a data access strategy of the target object according to the security status information, in which the data access strategy includes a resource that the target object is able to access and a resource that the target object is unable to access;

and a strategy sending module, configured to send the data access strategy to the business system, in which the data access strategy is used to enable the business system to determine access permissions of the target object for resources in the business system other than the resource of the target type according to the data access strategy.

Optionally, the apparatus 600 further includes:

an information generating module, configured to obtain permission change information according to the data access strategy in which the permission change information is used to represent that a resource access permission of the target object for the business system has been changed;

and an information sending module, configured to send the permission change information to the business system, in which the permission change information is used to enable the business system to send the permission change information to a terminal device of the target object through a long connection channel between the business system and the terminal device, to display the permission change information on the terminal device.

The logic executed by each functional module in the resource access apparatus 600 in the above-mentioned embodiment has been illustrated in detail in the method embodiments section, which will not be repeated here.

Figure 7:
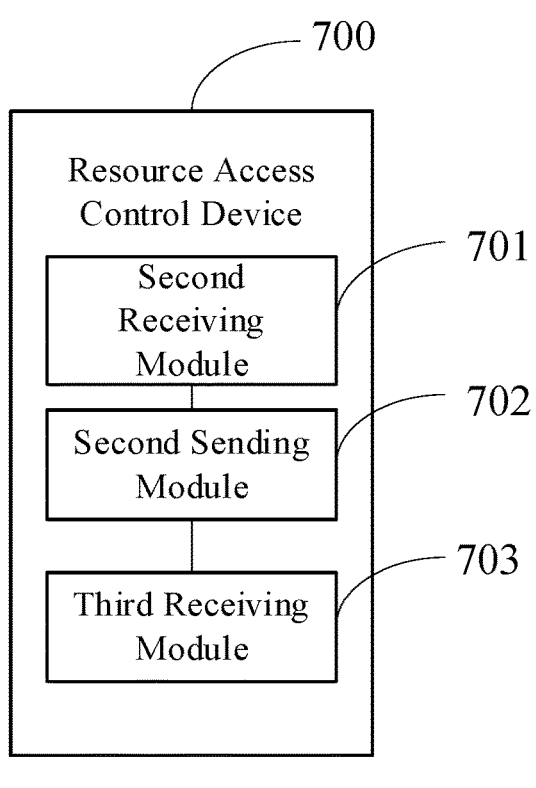
FIG. 7 is a schematic structural diagram of a resource access control apparatus provided by another exemplary embodiment.

FIG. 7 is a structural schematic diagram of a resource access control apparatus provided by another exemplary embodiment. As shown in FIG. 7, the embodiments of the present disclosure provide a resource access control apparatus, which is applied to a business system, and the resource access control apparatus 700 includes:

a second receiving module 701, configured to receive a resource access request sent by a target object, in which the resource access request is used to request access to a target resource;

a second sending module 702, configured to send an authentication request to a network control device in the case that the target resource belongs to a resource of a target type, in which the authentication request includes identity information of the target object and the target resource to be accessed by the target object, and the authentication request is used to enable the network control device to acquire historical resource access information and historical security status information of the target object from the business system according to the identity information of the target object, determine access permission information of the target object for the target resource according to the historical resource access information and the historical security status information, and send the access permission information to the business system;

and a third receiving module 703, configured to determine an operation for the resource access request according to the access permission information upon receiving the access permission information sent by a network security device.

Optionally, the apparatus 700 further includes:

a strategy receiving module, configured to, upon receiving a data access strategy of the target object sent by the network control device, determine access permissions of the target object for resources in the business system other than the resource of the target type according to the data access strategy.

The data access strategy is determined by the network control device according to security status information of the target object accessing the business system in the case that the security status information of the target object changes, and the data access strategy includes a resource that the target object is able to access and a resource that the target object is unable to access.

Optionally, the apparatus 700 further includes:

an information receiving module, configured to, upon receiving the permission change information sent by the network control device, send the permission change information to a terminal device of the target object through a long connection channel with the terminal device to display the permission change information on the terminal device, in which the permission change information is generated by the network control device according to the data access strategy, and the permission change information is used to represent that a resource access permission of the target object for the business system has been changed.

The logic executed by each functional module in the resource access apparatus 700 in the above-mentioned embodiment has been illustrated in detail in the method embodiments section, which will not be repeated here.

Figure 8:
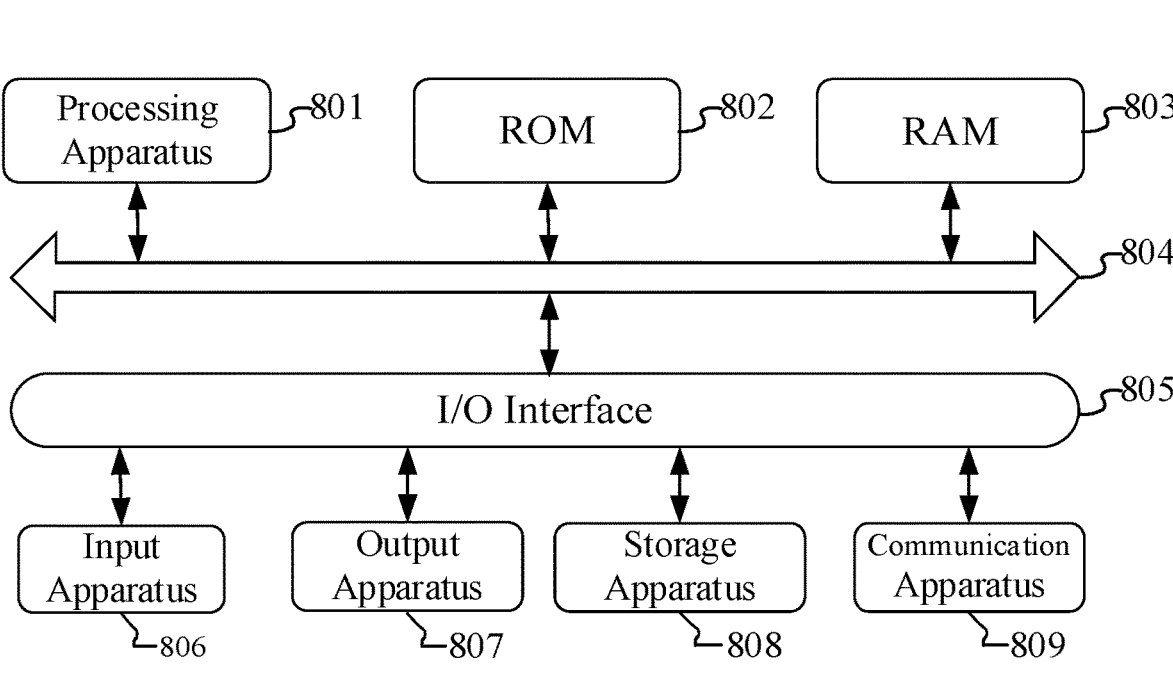
FIG. 8 is a schematic structural diagram of an electronic device provided by an exemplary embodiment.

Referring to FIG. 8, FIG. 8 illustrates a schematic structural diagram of an electronic device 800 (e.g., the business system 102 or the network control device 103 in FIG. 1) suitable for implementing the embodiments of the present disclosure. The electronic devices in the embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital TV, a desktop computer, or the like. The electronic device illustrated in FIG. 8 is merely an example, and should not pose any limitation to the functions and the range of use of the embodiments of the present disclosure.

As illustrated in FIG. 8, the electronic device 800 may include a processing apparatus 801 (e.g., a central processing unit, a graphics processing unit, etc.), which can perform various suitable actions and processing according to a program stored in a read-only memory (ROM) 802 or a program loaded from a storage apparatus 808 into a random-access memory (RAM) 803. The RAM 803 further stores various programs and data required for operations of the electronic device 800. The processing apparatus 801, the ROM 802, and the RAM 803 are interconnected by means of a bus 804. An input/output (I/O) interface 805 is also connected to the bus 804.

Usually, the following apparatuses may be connected to the I/O interface 805: an input apparatus 806 including, for example, a touch screen, a touch pad, a keyboard, a mouse, a camera, a microphone, an accelerometer, a gyroscope, or the like; an output apparatus 807 including, for example, a liquid crystal display (LCD), a loudspeaker, a vibrator, or the like; a storage apparatus 808 including, for example, a magnetic tape, a hard disk, or the like; and a communication apparatus 809. The communication apparatus 809 may allow the electronic device 800 to be in wireless or wired communication with other devices to exchange data. While FIG. 8 illustrates the electronic device 800 having various apparatuses, it should be understood that not all of the illustrated apparatuses are necessarily implemented or included. More or fewer apparatuses may be implemented or included alternatively.

Particularly, according to the embodiments of the present disclosure, the processes described above with reference to the flowcharts may be implemented as a computer software program. For example, the embodiments of the present disclosure include a computer program product, which includes a computer program carried by a non-transitory computer-readable medium. The computer program includes program code for performing the methods shown in the flowcharts. In such embodiments, the computer program may be downloaded online through the communication apparatus 809 and installed, or may be installed from the storage apparatus 808, or may be installed from the ROM 802. When the computer program is executed by the processing apparatus 801, the above-mentioned functions defined in the methods of the embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementations, the terminal devices, business systems, and network control devices may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: receive an authentication request sent by a business system, in which the authentication request is sent by the business system in the case that the business system determines a target resource to be accessed by a target object belonging to a resource of a target type according to a resource access request sent by the target object, and the authentication request includes identity information of the target object and the target resource to be accessed by the target object; acquire historical resource access information and historical security status information of the target object from the business system according to the identity information of the target object, in response to the authentication request; determine access permission information of the target object for the target resource according to the historical resource access information and the historical security status information; and send the access permission information to the business system, in which the access permission information is used to enable the business system to determine an operation for the resource access request according to the access permission information.

Optionally, the electronic device is caused to: receive a resource access request sent by a target object, in which the resource access request is used to request access to a target resource; in the case that the target resource belongs to a resource of a target type, send an authentication request to a network control device, in which the authentication request includes identity information of the target object and the target resource to be accessed by the target object, and the authentication request is used to enable the network control device to acquire historical resource access information and historical security status information of the target object from the business system according to the identity information of the target object, determine access permission information of the target object for the target resource according to the historical resource access information and the historical security status information, and send the access permission information to the business system; and upon receiving the access permission information sent by a network security device, determine an operation for the resource access request according to the access permission information.

The computer program code for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, function, and operation of possible implementations of systems, methods, and computer program products according to various embodiments of the present disclosure. In this regard, each block in the flowcharts or block diagrams may represent a module, a program segment, or a portion of code, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules involved in the embodiments of the present disclosure may be implemented in software or hardware. Among them, the name of the module does not constitute a limitation of the module itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

The above descriptions are merely preferred embodiments of the present disclosure and illustrations of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or method logical actions, it should be understood that the subject matter defined in the appended claims is not necessarily limited to the specific features or actions described above. Rather, the specific features and actions described above are merely example forms of implementing the claims. Regarding the apparatuses in the above-mentioned embodiments, the specific manner in which each module performs operations has been described in detail in the embodiments related to the method, and will not be described in detail here.

The invention claimed is:

1. A resource access control method, applied to a network control device, comprising:

receiving an authentication request sent by a business system, wherein the authentication request is sent by the business system in a case that the business system determines a first resource to be accessed by a first object belonging to a resource of a first type according to a resource access request sent by the first object, and the authentication request comprises identity information of the first object and the first resource to be accessed by the first object;

acquiring historical resource access information and historical security status information of the first object from the business system according to the identity information of the first object, in response to the authentication request;

determining access permission information of the first object for the first resource according to the historical resource access information and the historical security status information; and sending the access permission information to the business system, wherein the access permission information is used to enable the business system to determine an operation for the resource access request according to the access permission information;

wherein the determining the access permission information of the first object for the first resource according to the historical resource access information and the historical security status information, comprises:

determining a first risk item triggered by the first object, according to the historical resource access information and the historical security status information and in conjunction with a preset mapping relationship, wherein the mapping relationship comprises a corresponding relationship between different combinations of the historical resource access information and the historical security status information, and different risk items; and determining the access permission information of the first object for the first resource according to the first risk item.

2. The method according to claim 1, further comprising:

in a case that security status information of the first object accessing the business system changes, determining a data access strategy of the target-first object according to the security status information, wherein the data access strategy comprises a resource that the first object is able to access and a resource that the first object is unable to access; and sending the data access strategy to the business system, wherein the data access strategy is used to enable the business system to determine access permissions of the first object for resources in the business system other than the resource of the first type according to the data access strategy.

3. The method according to claim 2, further comprising:

obtaining permission change information according to the data access strategy, wherein the permission change information is used to represent that a resource access permission of the first object for the business system has been changed; and sending the permission change information to the business system, wherein the permission change information is used to enable the business system to send the permission change information to a terminal device of the first object through a long connection channel between the business system and the terminal device, to display the permission change information on the terminal device.

4. The method according to claim 1, further comprising:

in a case that security status information of the first object accessing the business system changes, determining a data access strategy of the first object according to the security status information, wherein the data access strategy comprises a resource that the first object is able to access and a resource that the first object is unable to access; and sending the data access strategy to the business system, wherein the data access strategy is used to enable the business system to determine access permissions of the first object for resources in the business system other than the resource of the first type according to the data access strategy.

5. The method according to claim 4, further comprising:

obtaining permission change information according to the data access strategy, wherein the permission change information is used to represent that a resource access permission of the first object for the business system has been changed; and sending the permission change information to the business system, wherein the permission change information is used to enable the business system to send the permission change information to a terminal device of the first object through a long connection channel between the business system and the terminal device, to display the permission change information on the terminal device.

6. A non-transitory computer-readable medium, storing a computer program, wherein in a case that the computer program is executed by a processing apparatus, the resource access control method according to claim 1 is implemented.

7. A resource access control method, applied to a business system, comprising:

receiving a resource access request sent by a first object, wherein the resource access request is used to request access to a first resource;

in a case that the first resource belongs to a resource of a first type, sending an authentication request to a network control device, wherein the authentication request comprises identity information of the first object and the first resource to be accessed by the first object, and the authentication request is used to enable the network control device to acquire historical resource access information and historical security status information of the first object from the business system according to the identity information of the first object, determine access permission information of the first object for the first resource according to the historical resource access information and the historical security status information, and send the access permission information to the business system; and upon receiving the access permission information sent by a network security device, determining an operation for the resource access request according to the access permission information;

wherein the authentication request is further used to enable the network control device to determine a first risk item triggered by the first object, according to the historical resource access information and the historical security status information and in conjunction with a preset mapping relationship, and determine the access permission information of the first object for the first resource according to the first risk item; wherein the mapping relationship comprises a corresponding relationship between different combinations of the historical resource access information and the historical security status information, and different risk items.

8. The method according to claim 7, further comprising:

upon receiving a data access strategy of the first object sent by the network control device, determining access permissions of the first object for resources in the business system other than the resource of the first type according to the data access strategy, wherein the data access strategy is determined by the network control device according to security status information of the first object accessing the business system in a case that the security status information of the first object changes, and the data access strategy comprises a resource that the first object is able to access and a resource that the first object is unable to access.

9. The method according to claim 8, further comprising:

upon receiving permission change information sent by the network control device, sending the permission change information to a terminal device of the first object through a long connection channel between the business system and the terminal device to display the permission change information on the terminal device, wherein the permission change information is generated by the network control device according to the data access strategy, and the permission change information is used to represent that a resource access permission of the first object for the business system has been changed.

10. An electronic device, comprising:

a storage apparatus, storing a computer program; and a processing apparatus for executing the computer program in the storage apparatus to implement the resource access control method according to claim 9.

11. An electronic device, comprising:

a storage apparatus, storing a computer program; and a processing apparatus for executing the computer program in the storage apparatus to implement the resource access control method according to claim 8.

12. A non-transitory computer-readable medium, storing a computer program, wherein in a case that the computer program is executed by a processing apparatus, the resource access control method according to claim 7 is implemented.

13. An electronic device, comprising:

a storage apparatus, storing a computer program; and a processing apparatus for executing the computer program in the storage apparatus to implement the resource access control method according to claim 7.

14. An electronic device, comprising:

a storage apparatus, storing a computer program; and a processing apparatus for executing the computer program in the storage apparatus to implement a resource access control method, wherein the resource access control method is applied to a network control device, and comprises:

receiving an authentication request sent by a business system, wherein the authentication request is sent by the business system in a case that the business system determines a first resource to be accessed by a first object belonging to a resource of a first type according to a resource access request sent by the first object, and the authentication request comprises identity information of the first object and the first resource to be accessed by the first object;

acquiring historical resource access information and historical security status information of the first object from the business system according to the identity information of the first object, in response to the authentication request;

determining access permission information of the first object for the first resource according to the historical resource access information and the historical security status information; and sending the access permission information to the business system, wherein the access permission information is used to enable the business system to determine an operation for the resource access request according to the access permission information;

wherein the determining the access permission information of the first object for the first resource according to the historical resource access information and the historical security status information, comprises:

determining a first risk item triggered by the first object, according to the historical resource access information and the historical security status information and in conjunction with a preset mapping relationship, wherein the mapping relationship comprises a corresponding relationship between different combinations of the historical resource access information and the historical security status information, and different risk items; and determining the access permission information of the first object for the first resource according to the first risk item.

15. The electronic device according to claim 14, wherein the resource access control method further comprises:

in a case that security status information of the first object accessing the business system changes, determining a data access strategy of the first object according to the security status information, wherein the data access strategy comprises a resource that the first object is able to access and a resource that the first object is unable to access; and sending the data access strategy to the business system, wherein the data access strategy is used to enable the business system to determine access permissions of the first object for resources in the business system other than the resource of the first type according to the data access strategy.

16. The electronic device according to claim 15, wherein the resource access control method further comprises:

obtaining permission change information according to the data access strategy, wherein the permission change information is used to represent that a resource access permission of the first object for the business system has been changed; and sending the permission change information to the business system, wherein the permission change information is used to enable the business system to send the permission change information to a terminal device of the first object through a long connection channel between the business system and the terminal device, to display the permission change information on the terminal device.

17. The electronic device according to claim 14, wherein the resource access control method further comprises:

in a case that security status information of the first object accessing the business system changes, determining a data access strategy of the first object according to the security status information, wherein the data access strategy comprises a resource that the first object is able to access and a resource that the first object is unable to access; and sending the data access strategy to the business system, wherein the data access strategy is used to enable the business system to determine access permissions of the first object for resources in the business system other than the resource of the first type according to the data access strategy.

18. The electronic device according to claim 17, wherein the resource access control method further comprises:

obtaining permission change information according to the data access strategy, wherein the permission change information is used to represent that a resource access permission of the first object for the business system has been changed; and sending the permission change information to the business system, wherein the permission change information is used to enable the business system to send the permission change information to a terminal device of the first object through a long connection channel between the business system and the terminal device, to display the permission change information on the terminal device.

* * * * *